(12) United States Patent
Palmer et al.

(10) Patent No.: US 7,096,602 B2
(45) Date of Patent: Aug. 29, 2006

(54) INTEGRATED FOOTWEAR CONSTRUCTION AND RELATED METHOD OF MANUFACTURE

(75) Inventors: Stephen M. Palmer, London (GB); Chao Ming Chin, Taipei (TW); Peter Ruston, Macau (MO); Chen Ching Shan, Taipei (TW); William J. B. Brown, Rockford, MI (US)

(73) Assignee: Wolverine World Wide, Inc., Rockford, MI (US)

( * ) Notice: Subject to any disclaimer, the term of this patent is extended or adjusted under 35 U.S.C. 154(b) by 276 days.

(21) Appl. No.: 10/848,670

(22) Filed: May 19, 2004

(65) Prior Publication Data

US 2005/0022429 A1    Feb. 3, 2005

Related U.S. Application Data

(63) Continuation-in-part of application No. 10/725,647, filed on Dec. 2, 2003, now Pat. No. 7,010,867.

(60) Provisional application No. 60/491,491, filed on Jul. 31, 2003, provisional application No. 60/551,392, filed on Mar. 9, 2003.

(51) Int. Cl.
*A43B 13/28* (2006.01)
*A43B 7/22* (2006.01)

(52) U.S. Cl. ............................ 36/12; 36/17 R; 36/30 R; 36/92

(58) Field of Classification Search ................ 36/12, 36/18, 17 PW, 17 A, 17 R, 21, 25 R, 30 R, 36/14, 91, 92, 43
See application file for complete search history.

(56) References Cited

U.S. PATENT DOCUMENTS 1,756,169 A * 4/1930 Jaroslav ................... 36/17 R 4,505,055 A * 3/1985 Bergmans ................. 36/18
4,642,915 A   2/1987 Pfander (Continued)

FOREIGN PATENT DOCUMENTS

DE           895867           11/1953

(Continued)

OTHER PUBLICATIONS

Prior Art Reference A.

(Continued)

*Primary Examiner*—Marie Patterson
(74) *Attorney, Agent, or Firm*—Warner Norcross & Judd LLP

(57) ABSTRACT

An integrated article of footwear including a waterproofing membrane direct attached to an upper of the footwear. An outsole is further secured to the membrane and/or the upper. In one embodiment, the membrane includes a visible aesthetic bead in the footwear forefoot region, but not the heel region. The membrane may be of greater thickness in the forefoot region to provide added rigidity. A heel cradle is positioned in the footwear heel region between the upper and the outsole. The footwear provides the durability of a direct attach construction in the forefoot and the comfort and cushion of an athletic construction in the heel of the shoe. A method for constructing the footwear includes direct attaching the membrane to an upper of the shoe. Optionally, a heel cradle is disposed in the heel region of the shoe, and the outsole is secured to the heel cradle and/or upper there.

18 Claims, 6 Drawing Sheets

U.S. PATENT DOCUMENTS

| | | | |
|---|---|---|---|
| 4,662,018 A | | 5/1987 | Autry |
| 4,685,223 A | | 8/1987 | Long |
| 4,704,808 A | | 11/1987 | Bianchini et al. |
| 4,876,807 A | * | 10/1989 | Tiitola et al. .................. 36/114 |
| 5,426,869 A | * | 6/1995 | Gore et al. ................. 36/22 R |
| 5,768,801 A | | 6/1998 | Huff |
| 5,893,186 A | | 4/1999 | Issler et al. |
| 6,029,301 A | | 2/2000 | Issler et al. |
| 7,010,867 B1 | * | 3/2006 | Brown .......................... 36/12 |
| 2003/0121177 A1 | | 7/2003 | Lee |

FOREIGN PATENT DOCUMENTS

| | | |
|---|---|---|
| DE | 36 39 362 | 5/1988 |
| EP | 974281 | 1/2000 |
| WO | WO 97/36511 | 10/1997 |
| WO | WO 02/102564 | 12/2002 |

OTHER PUBLICATIONS

Prior Art Reference B.
ARS, Dec. 1975, 3 pp.
Stil Gar, 2 pp.
Foto Shoe, Aug. 1990, 3 pp.
Foto Shoe, Feb. 1991, 2 pp.
ARS, 1969, 4 pp.
ARS, 1993, 3 pp.
ARS, 1991, 3 pp.
ARS, 1994, 3 pp.

* cited by examiner

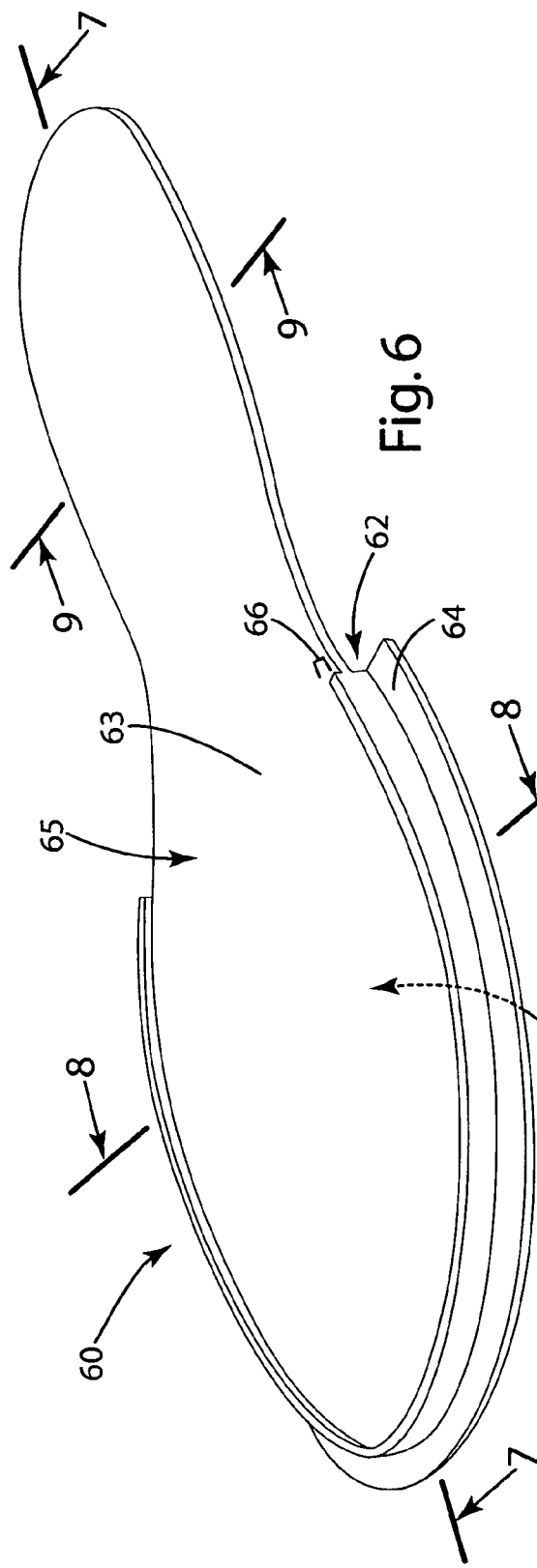
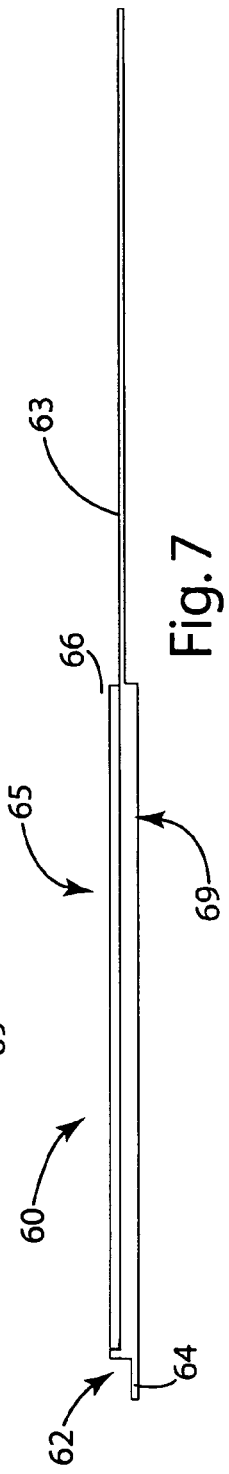
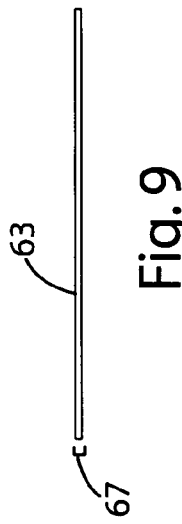
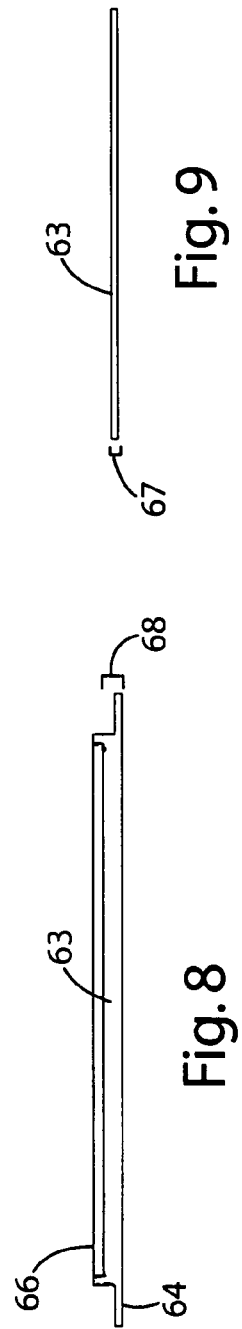
Fig. 6
Fig. 7
Fig. 9
Fig. 8

INTEGRATED FOOTWEAR CONSTRUCTION AND RELATED METHOD OF MANUFACTURE

This application claims benefit of U.S. Provisional Application No. 60/551,392, filed Mar. 9, 2003, and is a continuation-in-part of U.S. application Ser. No. 10/725,647, filed Dec. 2, 2003 now U.S. Pat. No. 7,010,867, which claims benefit of U.S. Provisional Application No. 60/491,491, filed Jul. 31, 2003.

BACKGROUND OF THE INVENTION

The present invention relates to footwear and, more particularly, to a footwear construction and method for making the same.

There is an ongoing effort in the footwear industry to produce footwear that provides durability, a high level of comfort, and a degree of waterproofing. Such footwear is targeted toward individuals who stand for long periods of time on hard surfaces (e.g., concrete floors), who must travel on foot for significant distances, or who must occasionally traverse wet or damp areas or worksites.

Conventional footwear constructions, however, provide one of durability, comfort, or waterproofing, but usually not all three because the features required for these characteristics typically negate one another. For example, one construction known for its durability is a direct attach construction, which may be incorporated into work or hiking boots. In such a construction, a midsole, constructed of a soft, resilient material provides a uniform-depth cushion along the entire length of the shoe between the upper and the more rigid and durable outsole. This midsole is constructed with a process in which the midsole is "direct attached" to the upper, from heel to toe, in a mold. In other words, the midsole material is injected into a mold adjacent the upper and, as the material cures, it bonds to the exposed portion of the upper along the entire length of the footwear. To complete the footwear, an outsole is glued to the midsole, opposite the upper. This direct attach midsole is thus joined very securely to the upper to provide a durable shoe.

Although this construction is durable and aesthetically pleasing, it sometimes compromises the flexibility and comfort of the shoe due to the bond between the midsole and the upper, as well as the uniform depth, sheet-like construction of the midsole along the entire length of the footwear. Moreover, because the midsole and outsole are substantially uniform from heel to toe of the footwear, there is little or no cushion variation provided for different regions of the foot, which in turn may compromise the comfort of the shoe. Finally, the midsole, by itself, has minimal waterproofing capabilities.

Although different constructions exist that provide desired durability, waterproofing characteristics, or comfort, there remains an unmet need for an integrated footwear construction that provides the best of all requirements.

SUMMARY OF THE INVENTION

The aforementioned problems are overcome in the present invention, which provides a footwear construction including a membrane direct attached to an upper in the forefoot and the heel regions of the footwear to provide a waterproof barrier. The membrane includes an aesthetic bead in the forefoot region of the footwear, but not in the heel region.

In another embodiment, the thickness of the membrane is greater in the forefoot region than in the heel region. The membrane bead may be disposed around a perimeter of the membrane in the forefoot region adjacent the thicker portion of the membrane.

In another embodiment, the footwear construction may include a heel cradle to provide the desired amount of heel cushioning and stability. The heel cradle may be secured to the membrane and/or upper rearward of the thicker portion of the membrane.

In yet another embodiment, a water impermeable liner is secured or joined with the upper. This liner cooperates with the membrane to provide an ever greater degree of waterproofing.

The footwear of the present invention is manufactured by: direct attaching a membrane to an upper in the forefoot and heel region, the membrane including a thicker portion and/or an aesthetic bead in the forefoot region; joining the upper and/or membrane to an outsole; and optionally, securing a heel cradle between the upper and the outsole in the heel region.

The present invention provides a revolutionary footwear construction with an unparalleled combination of durability and comfort. The direct attached membrane makes the forefoot region of the footwear durable and well-supported. The membrane also renders the footwear substantially waterproof in regions and along seams previously difficult to waterproof. In the heel region of the footwear, the heel cradle provides extraordinary comfort by absorbing and returning energy produced in every step, and by offering a comfortable platform to stand on for long periods.

These and other objects, advantages and features of the invention will be more readily understood and appreciated by reference to the detailed description of the invention and the drawings.

BRIEF DESCRIPTION OF THE DRAWINGS

FIG. 6 is perspective view of a membrane of the present invention;

FIG. 7 is a sectional view of the membrane taken along line 7—7 of FIG. 6;

FIG. 8 is a sectional view of the membrane taken along line 8—8 of FIG. 6;

FIG. 9 is a sectional view of the membrane taken along line 9—9 of FIG. 6; and

DETAILED DESCRIPTION OF THE INVENTION

Figure 1:
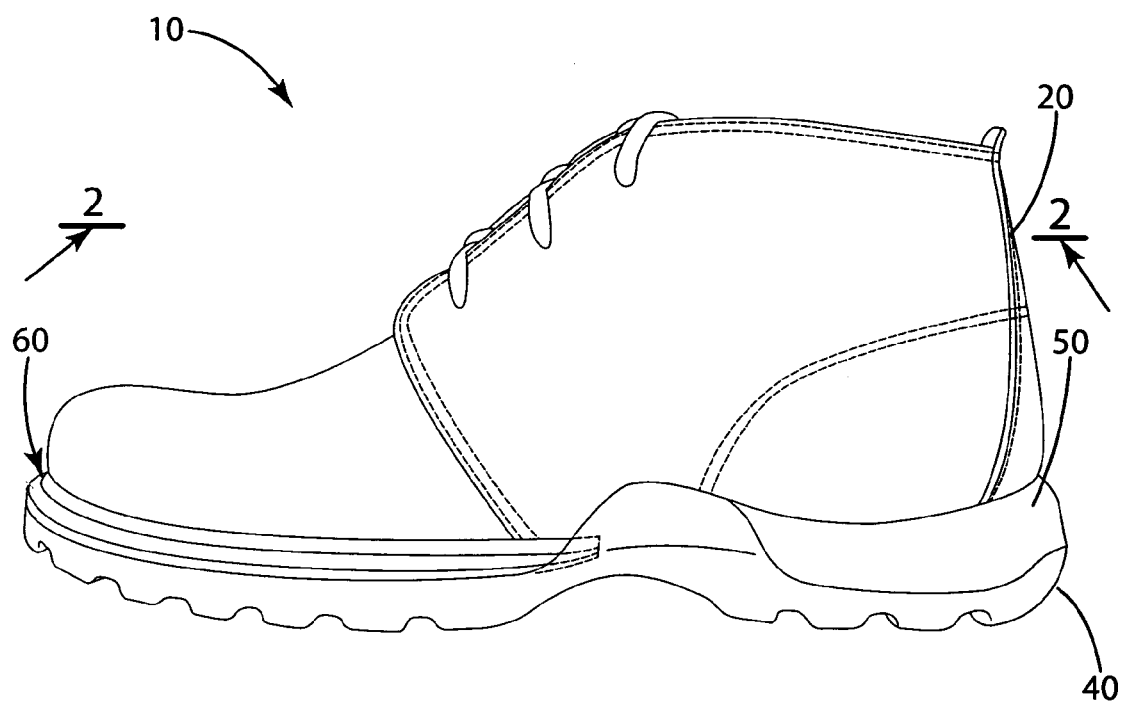
FIG. 1 is side elevational view of an article of footwear incorporating the integrated construction of the present invention.

A shoe incorporating the integrated construction of the present invention is shown in FIG. 1 and generally designated 10. For purposes of the disclosure, the present invention is described in connection with a ¾ height boot, however, the present invention is well suited for use with other types of soled footwear.

In general, the shoe 10 includes an upper 20 secured to an outsole 40. A membrane 60 is direct attached to the upper 20. The direct attach membrane shown includes a bead 62 that terminates short of the heel region of the shoe. The heel region includes a heel cradle 50 positioned between the upper 20 and the outsole 40. Here, the upper and/or membrane may be secured to the heel cradle and/or outsole with an adhesive or cement.

As used herein, the term "arch region" refers generally to the portion of the shoe corresponding to the arch of the wearer's foot; the term "forefoot region" refers generally to the portion of the shoe forward of the arch region corresponding to the forefoot (e.g., the ball and the toes) of a wearer's foot; and the term "heel region" refers generally to that portion of the shoe rearward of the arch region corresponding to the heel of the wearer's foot. The forefoot region 42, arch region 43 and heel region 44 are generally identified in FIG. 2, however, it is to be understood that delineation of these regions may vary depending upon the configuration of the footwear.

Figure 3:
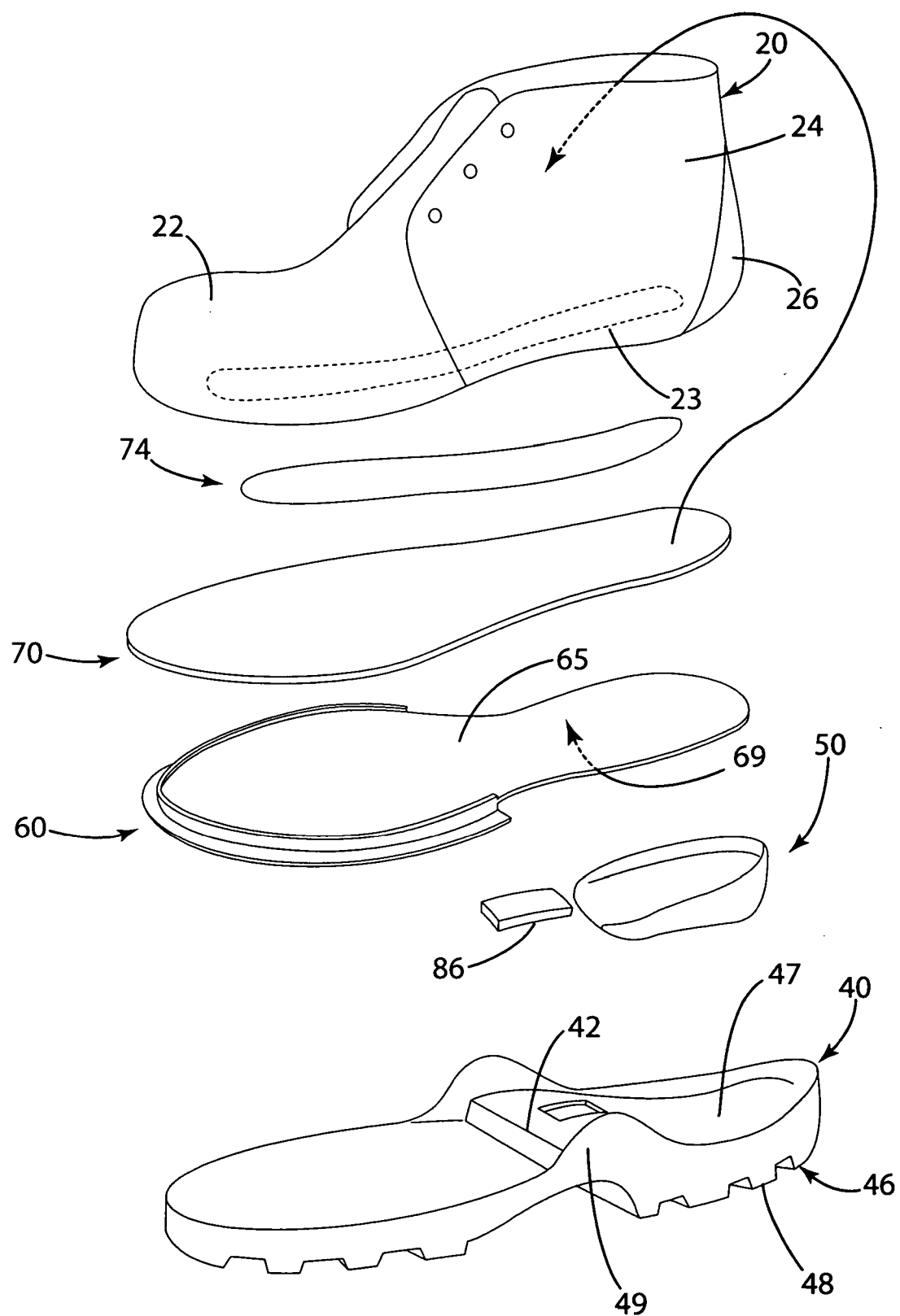
FIG. 3 is an exploded perspective view of the footwear.

The upper 20 is generally conventional and will not be described in detail. Suffice it to say that the upper 20 includes vamp 22, quarters 24 and backstay 26. With reference to FIG. 3, the upper 20 includes a lower portion that transitions to an allowance 23, also referred to as a peripheral allowance, which is folded inward toward the center of the footwear. This peripheral allowance, and in some cases, the lower portion of the upper, is direct attached to the membrane 60, as described in detail below. The peripheral allowance may be secured to the insole 70, or optionally strobel stitched to an insole and/or fabric sock liner (not shown). The upper 20 may be manufactured from leather, canvas, nylon, or other suitable materials and may include a liner (not shown) or other conventional accessories.

Figure 2:
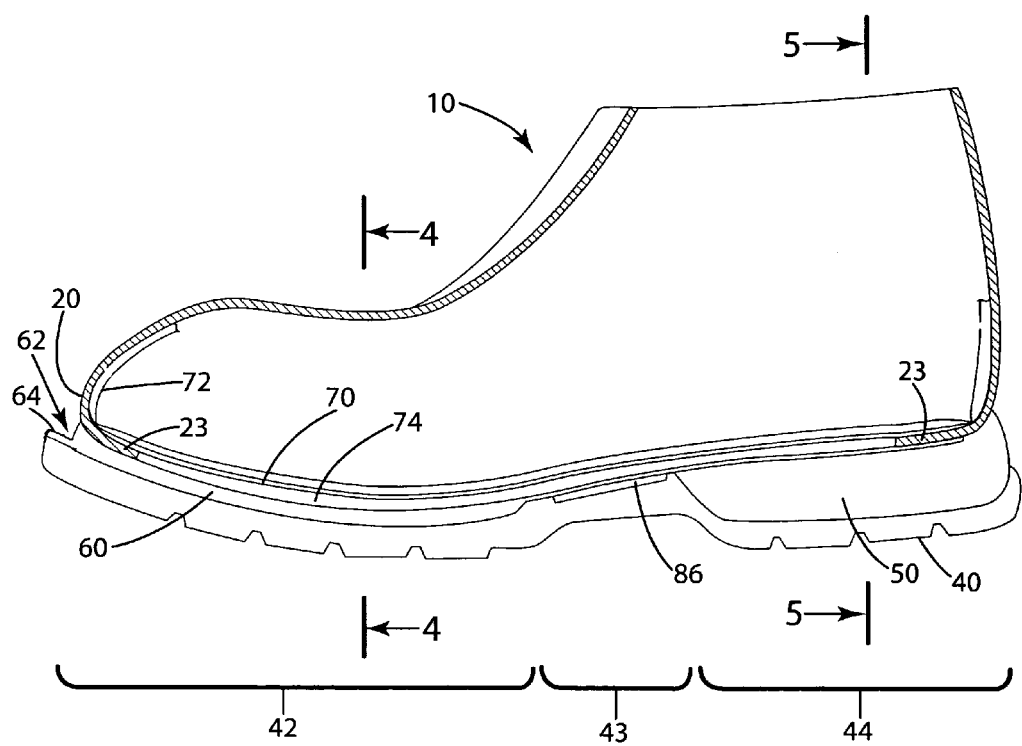
FIG. 2 is a sectional view of the footwear taken along line 2—2 of FIG. 1.
Figure 4:
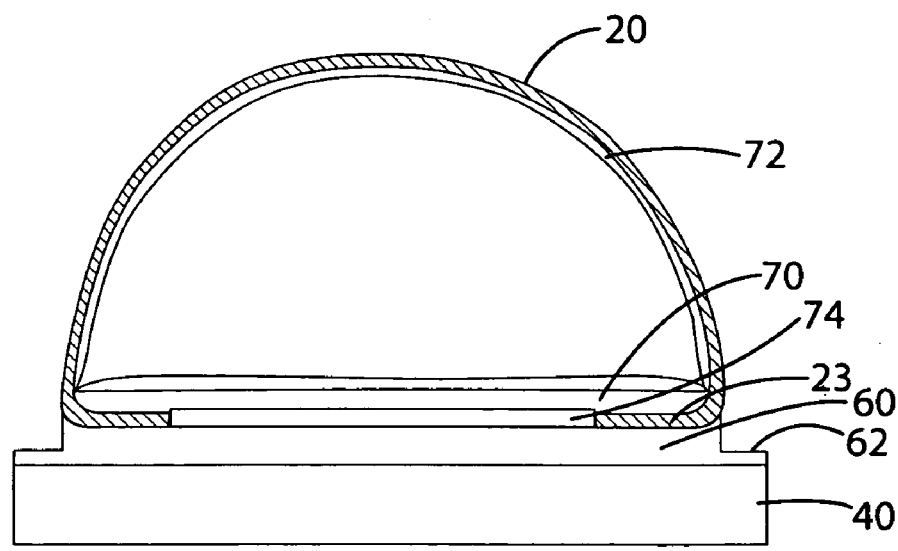
FIG. 4 is a sectional view of the footwear taken along line 4—4 of FIG. 2.
Figure 5:
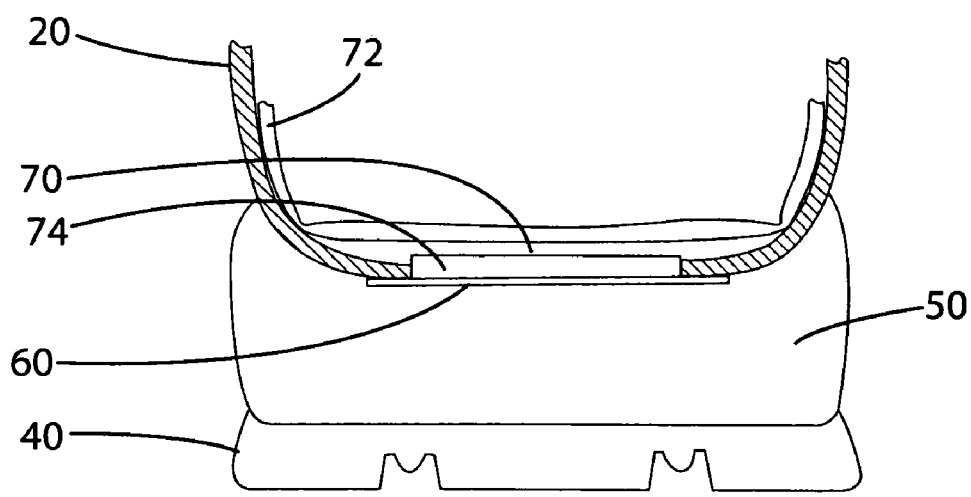
FIG. 5 is a sectional view of the footwear taken along line 5—5 of FIG. 2.

A water impermeable liner 72 is optionally secured to an interior of the upper 20. This liner, as shown in FIGS. 2 and 4–5, extends downward, toward the inwardly folded peripheral allowance 23. In one embodiment, the liner terminates a pre-selected distance above the fold of the upper that forms the peripheral allowance. In another embodiment, the liner extends upwardly to the uppermost portion of the shoe 10. The liner may be constructed of any material, but preferably is constructed from a water impermeable fabric or material. Suitable materials include the material sold under the trademark GORE-TEX, which is commercially available from W.L. Gore & Associates, Inc. of Newark, Del., and the material sold under the trademark SYMPATEX, which is commercially available from SympaTex Technologies GmbH, Wuppertal, Germany. The liner may additionally or alternatively be constructed from a continuous layer of waterproof thermoplastic or adhesive, which coats the interior of the upper.

In the region defined between opposing edges of the peripheral allowance, a filler 74 may be disposed. This filler may be constructed from a conventional cushioning material, such as polyurethane.

The outsole 40 is manufactured from a relatively hard rubber or other sufficiently durable and wear-resistant material. The bottom 46 includes an outer surface 48 that forms the wearing surface of the outsole 40 and is contoured to the desired heel and tread pattern. The outer surface 48 may be textured to improve the traction and aesthetic appeal of the shoe. Optionally, the upper surface 47 of the outsole may be textured as desired. As shown in FIG. 3, the outsole 40 may include a wall 42 disposed in the arch region 43. This wall may be substituted with a rounded barrier or eliminated altogether. It also may be disposed in the forefoot region 42 and/or the heel region 44 as desired. The wall may extend partially or completely across the outsole, and optionally terminate at the flange 49, which extends upwardly in at least the arch region, and optionally in the heel region. The outsole 40 is secured to the membrane 60 and the heel cradle 50 with cement or adhesives, or as desired, direct attached to these components.

As depicted in FIGS. 2–4, the membrane 60 is direct attached to the peripheral allowance 23, and where included, the filler 74 along a substantial portion of the length of the footwear. In such a direct attach construction, the material from which the membrane is constructed bonds directly to the peripheral allowance, the filler, and a lower portion of the upper. The membrane includes a plate 63, which extends along the length of the footwear, and a bead 62, which terminates forward of the heel region 44 without extending into the heel region. However, in some applications, the bead may extend into at least the arch region. The bead may be secured to the upper 20 substantially only in the forefoot region 42, and may extend upwardly and around the lower periphery of the upper in the forefoot.

For a clean appearance in the finished footwear, the ends of the bead 62 and for the bead flange 64 are disposed behind the flange 49 of the outsole 40. In this configuration, the ends of these components are concealed from sight. As desired, the bead 62 and bead flange 64 may extend to the wall or barrier 42 of the outsole. The membrane and its components may be manufactured from polyvinyl chloride, hard durable rubber, or other materials as desired.

With reference to FIGS. 6–9, the membrane 60 will be described in more detail. The membrane includes a plate 63, having first 65 and second 69 sides. As shown, the first side 65 is formed against and/or bonds to the upper 20 and filler 74 when the membrane is direct attached to these components. The plate 63 is relatively planar on its upper surface, i.e. the first side, and substantially covers the opening defined between opposing peripheral allowances 23 to effectively seal with a waterproof barrier the lower portion of the upper 20. In the forefoot region 42 of the footwear, a first flange 66 extends upwardly adjacent the upper 20, and is secured to the upper there by direct attachment. Also in the forefoot region, the membrane includes a bead 62. The bead extends downwardly from the insole plate a pre-selected distance. At the lowermost portion of the bead, a second flange 64, also referred to as a bead flange, extends outwardly around a perimeter of the footwear in at least one of the forefoot region and the arch region. As desired, the bead and flanges may exist anywhere forward of the heel region.

The plate 63 in the region of the footwear where the bead 62 exists may be of equal or greater thickness than the region of the footwear where there is no bead. For example, as shown in FIGS. 2 and 8–9, the first thickness 68 of the membrane 60 in the forefoot region 42 is greater than the second thickness 67 of the membrane 60 in the arch 43 and heel region 44. In an alternative embodiment, the plate 63 is of a substantially equal thickness throughout the length, and the bead is a downward extension of the first flange 66 to the bead flange 64. As desired, the membrane and all of the flanges, the bead, and the plate may be a single, unitary, integral component.

The membrane 60 and waterproof liner 72, which is secured within or to the upper 20, may cooperate to render the interior of the upper substantially waterproof.

As shown in FIGS. 2–3, the insole 70 extends along the entire length of the shoe, and may be constructed of any conventional cushioning material. In the heel region 44 and, optionally, the arch region 43, the insole is secured via conventional means, for example, adhesives, cement, stitching or the like to the interior side of the peripheral allowance 23 of the upper. Optionally, a shank 86 of steel, plastic or other material is secured to the bottom of the insole 70 in the arch region 43 of the shoe. The shank may be secured to other components of the shoe as desired, and may overlap with the other regions, for example, the forefoot region 42 and heel region 44.

With reference to FIGS. 2, 3 and 5, the shoe includes a heel cradle 50 that snugly fits in or adjacent the outsole 40. The heel cradle 50 is preferably cup-shaped to cradle the heel of the wearer and extend upwardly around at least a portion of the wearer's heel. As shown, the heel cradle 50 is positioned substantially only in the heel region 44 and terminates at or slightly within the arch region 43. As desired, the cradle may terminate short of the arch region or may extend beyond the arch region into the forefoot region 42. This heel cradle is secured with adhesives or cement directly to the upper 20. In the embodiments shown, the cradle is adhered to the peripheral allowance 23 of the upper 20 and optionally, a portion in the undersurface of the insole 70. The heel cradle is preferably made from a low density cushioning material. In one embodiment, the heel cradle 50 is constructed from an ethylvinyl acetate (EVA) foam. The rigidity and the flexibility of the EVA foam can be varied from application to application as desired.

In the fully assembled footwear shown in FIGS. 2, 4 and 5, the outsole 40 is secured in the forefoot region to the membrane 60, and to at least the heel cradle 50 in the heel region 44. This securement may be provided by cement, adhesives or other conventional attachment means. When assembled, the rearmost portion of the bead 62, including the bead flange 64, is adjacent the wall 42 of the outsole, however these components may also abut against the wall as desired. In constructions where the outsole does not include a wall, the heel cradle 50 may extend forward to abut or join with the thicker portion of the membrane, or the membrane 60 may extend rearward to, abut against, or join with the heel cradle. The shank 86 and exposed portion of the underside of the insole 70 may or may not be secured to the outsole 40 as desired.

MANUFACTURE AND ASSEMBLY

Manufacture of the shoe 10 will now be described with reference to FIGS. 3–6 and 100. The upper 20 is manufactured using generally conventional techniques and apparatus. The desired upper material (not shown) is cut to form the upper. Although not shown, the upper may include multiple elements, such as a vamp, quarters and a back stay. If included, these pieces of the upper are fitted and sewn together. The water impermeable liner 72 is secured within the upper via adhesives or stitching that does not deteriorate the water impermeability of the liner in the desired areas. This liner is fitted to the upper so that in the finished footwear, it extends downward a sufficient distance so that the later-added membrane terminates above the lowermost portion of the liner.

The insole 70 is fitted on a last 100, and the fitted upper 20 is stretched over the insole and the last. The peripheral allowance 23 is secured with a cement, adhesive or other attachment means to the underside of the insole 70. The peripheral allowance 23 may be temporarily tacked or stapled to the last to hold the allowance in place. The filler 74 may further be cut and trimmed to fit within the void defined between opposing sides of the peripheral allowance 23. This filler may be cemented or adhered within this void to the underside of the insole 70 and the edge of the peripheral allowance 23 as desired.

Figure 10:
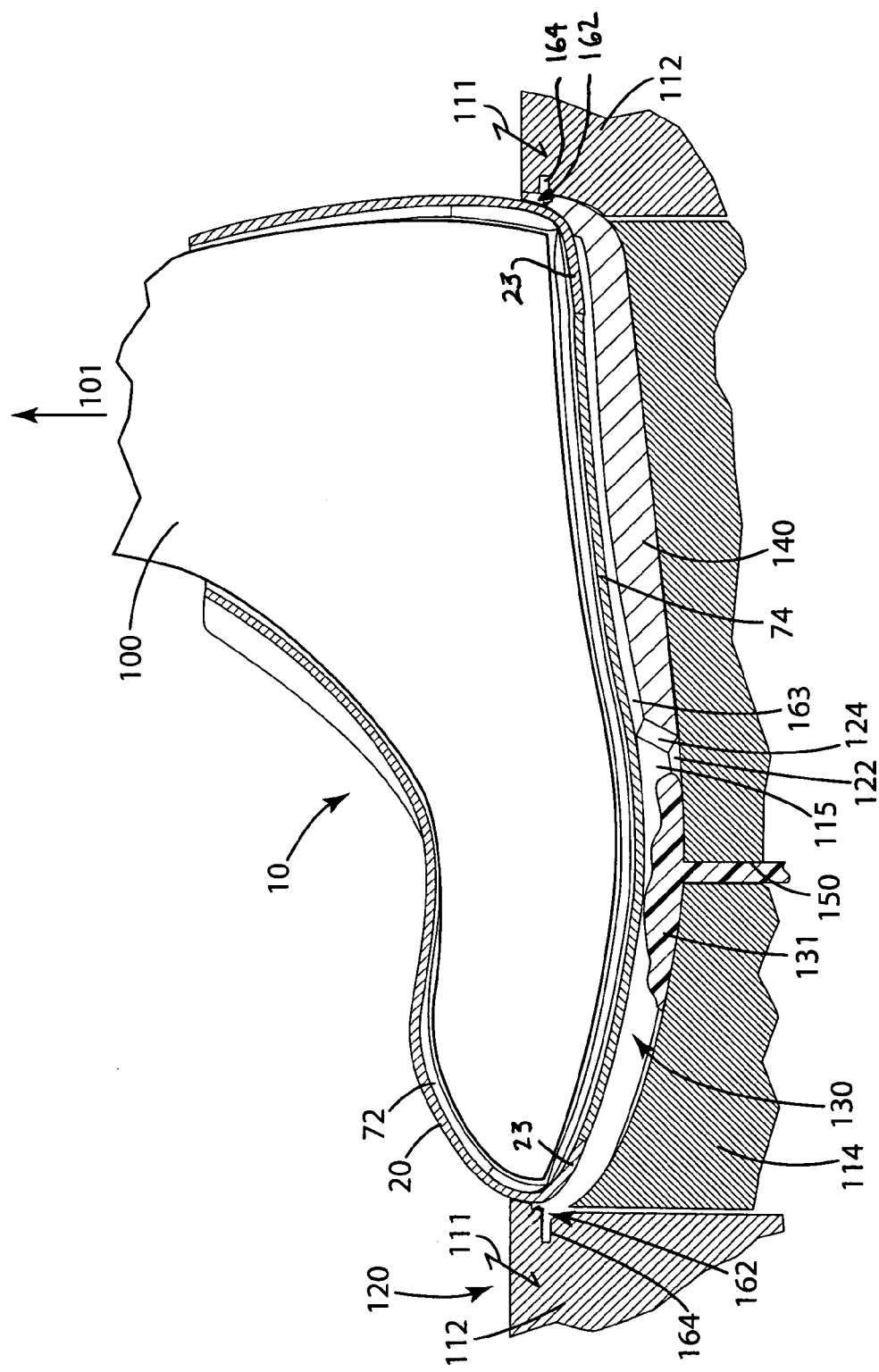
FIG. 10 is a sectional view of a direct attach method of the present invention.

With the upper 20 secured to the insole 70 as desired and stretched over a last 100, these components are prepared for a direct attach molding operation, which is shown in FIG. 10. The last 100 is lowered against the membrane mold 120, which includes side molds 112 and a bottom mold 114. Only one side mold 112 is shown in FIG. 10, however, it is noted that a corresponding side mold opposing the depicted side mold is included. Each side mold 112 wraps around the sides of the lasted upper 20, and mate with one another at the front and rear of the shoe. The side molds 112 and bottom mold 114 cooperate to define a membrane cavity 130 of varying thickness but running along the length of the footwear as shown. This cavity 130 is greater in depth in the forefoot region than in the heel region. Moreover, the cavity in the forefoot portion further defines corresponding bead 162 and bead flange 164 voids that, when filled with material, form the bead and bead flange of the completed membrane.

It is noted here that the varying depth and deletion of the bead features in the heel region and/or arch region may be accomplished using a mold insert 140 with the mold 120. As shown, the insert 140 rests in the membrane cavity 130, and thereby occupies the space that would otherwise be filled by material when that material is injected into the cavity. The insert 140 further extends upwardly to cover the bead 162 and bead flange 164 voids so that material cannot enter those voids and form corresponding features in the direct attach process. The insert is generally the same shape as the heel and/or arch region of the footwear, and of a depth that is a pre-selected amount less than the depth of the membrane cavity. The insert may also include bead and flange features (not shown) so that these features can more securely interfit with the corresponding features of the side molds.

The side mold 112 includes a cavity side wall 115 which generally forms a side wall of the finished membrane. The bottom mold 120 may include a base wall 122, which generally forms the bottom of the finished membrane. The base mold, or the insert 140 when included, may also include a membrane terminating wall 124. The molds may be modified to form any portion or combination of side walls, bottom walls or other walls as desired. Optionally, the thicker region of the membrane cavity 130 in some applications may extend rearward into the arch region of the footwear, short of the heel region. In which case, the terminating wall may be positioned further rearward.

With the components of the mold 120, i.e., the side molds 112 and the bottom mold 114, positioned to form the membrane cavity 130, the appropriate volume of material to form the membrane 60 is injected or poured through port 150 into the cavity 130. Preferably, the mold 110 holds the upper 20 firmly enough to prevent material from exiting the mold 110 from the top of the cavity 130. As the material 131 is introduced into the cavity 133, it substantially fills the cavity 130 until the entire membrane 60 is formed.

The midsole material 131 is allowed to sufficiently cure and direct attach the membrane 60 to the upper 20, filler 74, and/or insole 70. The side molds 110 are moved away from the footwear in the direction of the arrows 111. The last 100 is moved upward in the direction indicated with the vertical arrow 101. Any excess flashing resulting from the direct attach process may be trimmed from the membrane. With the flashing trimmed from the membrane 60, the membrane is readied for securing the outsole 40 to it. Optionally, a shank 86 may be secured to the undersurface of the filler 74.

The outsole 40 is injection molded or pour molded from a hard, durable rubber using conventional molding apparatus. Its construction may be completed before any other components of the footwear are assembled as desired. The tread pattern 48 on the lower surface 46, the upwardly extending flanges 48, and the wall 42 of the outsole are formed during the molding operation as integral parts of the outsole 40. With the outsole manufactured, the heel cradle 50 is secured to the outsole 40 in the heel region 44. In those applications where a large heel cradle is used, the cradle may also be secured to the arch region and possibly extend into the forefoot region 42 as desired. These components may be secured together with cement, adhesive or other attachment means.

In another step, the outsole 40 is secured with cement or adhesives to the membrane 60 along the entire length of the membrane. Preferably, the terminating end of the beaded region of the membrane aligns with the wall 42 of the outsole 40 so that it is disposed adjacent and/or abuts the wall. In one embodiment, the outsole is secured to the remainder of the footwear so that the flange 48 conceals the terminating end of the bead 62 and bead flange 64 and provides a clean appearance. In the heel region 44, the heel cradle is adhered or cemented to the peripheral allowance 23 of the upper, and where exposed, the undersurface of the insole 70. In the arch region, the outsole is secured to the other components of the shoe as desired.

With the outsole 40 secured to the membrane 60 and heel cradle 50/upper 20, the shoe 10 may be removed from the last. A number of conventional finishing operations may then be performed on the shoe 10. For example, the edges of the membrane 60, the membrane bead 62, and bead flange 64, and the outsole 40 are trimmed and shaped; and the upper 20 is cleaned, polished and treated as appropriate and necessary.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "the," is not to be construed as limiting the element to the singular.

The embodiments of the invention in which an exclusive property or privilege is claimed are defined as follows:

1. A footwear construction comprising:
    an upper including a forefoot portion, a heel portion, a lower portion and a peripheral allowance;
    a membrane direct attached to the peripheral allowance in the forefoot portion and the heel portion, the membrane including a plate of a first thickness in the forefoot portion and a second thickness in the heel portion, the first thickness being greater than the second thickness, the membrane including a bead flange extending outwardly around at least a portion of a perimeter of the plate in the forefoot portion and terminating short of the heel portion, the membrane including an upper flange extending upwardly from the insole plate and adjacent the upper, the membrane being of a unitary construction and forming a substantially waterproof barrier in at least the lower portion of the upper;
    a heel cradle secured to the peripheral allowance in the heel portion; and
    an outsole secured to the membrane in the forefoot portion, the outsole secured to at least one of the heel cradle and the peripheral allowance in the heel portion.

2. The footwear construction of claim 1 wherein the upper flange is direct attached to the lower portion of the upper in substantially only the forefoot portion.

3. The footwear construction of claim 2 wherein the outsole coterminates with the bead flange.

4. The footwear construction of claim 1 wherein the outsole defines an upwardly extending flange and wherein the bead flange includes an end that terminates behind the flange so that the end is hidden from sight.

5. The footwear construction of claim 1 wherein the upper includes an arch portion, and wherein the bead flange extends from the membrane in the forefoot region and in the arch region, but not in the heel portion.

6. The footwear construction of claim 1 wherein the upper includes an arch portion, and wherein the outsole includes an upwardly extending wall that traverses at least a portion of a width of the outsole in at least one of the forefoot region and the arch region.

7. The footwear construction of claim 6 wherein the membrane first thickness changes to the second thickness near the upwardly extending wall.

8. A footwear construction comprising:
    an upper defining an interior and including a forefoot portion, an arch portion, a heel portion and a peripheral allowance;
    an outsole;
    a membrane including a first side and a second side, the first side direct attached to the upper in the forefoot portion, the arch portion and the hell portion, the membrane including an aesthetic bead terminating short of the heel portion, the membrane forming a waterproof barrier around the peripheral allowance, the membrane joined on at least a portion of the second side to the outsole; and
    a water impermeable lining secured to the interior of the upper, wherein the membrane and water impermeable lining cooperate to render the interior of the upper substantially waterproof the bead includes bead flange extending outward from a periphery of the membrane and an upper flange extending upwardly from the membrane, wherein the upper flange is exposed and viewable by a viewer of the finished footwear construction.

9. A footwear construction comprising:
    an upper defining an interior and including a forefoot portion, an arch portion, a heel portion and a peripheral allowance;
    an outsole;
    a membrane including a first side and a second side, the first side direct attached to the upper in the forefoot portion, the arch portion and the heel portion, the membrane including an aesthetic bead terminating short of the heel portion, the membrane forming a waterproof barrier around the peripheral allowance, the membrane joined on at least a portion of the second side to the outsole;
    a water impermeable lining secured to the interior of the upper, wherein the membrane and water impermeable lining cooperate to render the interior of the upper substantially waterproof; and
    a heel cradle positioned between the membrane and the outsole.

10. A footwear construction comprising:
    an upper defining an interior and including a forefoot portion, an arch portion, a heel portion and a peripheral allowance;

an outsole;
a membrane including a first side and a second side, the first side direct attached to the upper in the forefoot portion, the arch portion and the heel portion, the membrane including an aesthetic bead terminating short of the heel portion, the membrane forming a waterproof barrier around the peripheral allowance, the membrane joined on at least a portion of the second side to the outsole; and
a water impermeable lining secured to the interior of the upper, wherein the membrane and water impermeable lining cooperate to render the interior of the upper substantially waterproof,
wherein the membrane is of a first thickness in a region adjacent the forefoot portion, and of a second thickness in a region adjacent the heel portion, the first thickness being greater than the second thickness.

11. A footwear construction comprising:
an upper defining an interior and including a forefoot portion, an arch portion, a heel portion and a peripheral allowance;
an outsole;
a membrane including a first side and a second side, the first side direct attached to the upper in the forefoot portion, the arch portion and the heel portion, the membrane including an aesthetic bead terminating short of the heel portion, the membrane forming a waterproof barrier around the peripheral allowance, the membrane joined on at least a portion of the second side to the outsole; and
a water impermeable lining secured to the interior of the upper, wherein the membrane and water impermeable lining cooperate to render the interior of the upper substantially waterproof wherein the outsole defines an upwardly extending flange, and wherein the bead includes an end that terminates adjacent the flange.

12. A waterproofing membrane for footwear including a forefoot portion, an arch portion and a heel portion, comprising: a unitary component including a plate of a first thickness in the forefoot portion and of a second thickness in the heel portion, the first thickness being greater than the second thickness, a bead flange extending outwardly around a perimeter of the component in the forefoot portion, the bead flange terminating short of the heel portion, and another flange extending upwardly from the plate in the forefoot portion, but terminating short of the heel portion.

13. A method for manufacturing footwear including a forefoot portion, an arch portion and a heel portion, comprising:
direct attaching a membrane to an upper in the forefoot portion, the arch portion and the heel portion, the membrane including a plate of a first thickness in the forefoot portion and of a second thickness in the heel portion, the first thickness being greater than the second thickness, the membrane including a bead flange extending outwardly a round a perimeter of the membrane in the forefoot portion, the bead flange terminating short of the heel portion, the membrane forming a substantially waterproof barrier in an area of the upper to which the membrane is attached;
joining an outsole with a heel cradle; and
joining at least one of the upper and the membrane with at least one of the outsole and the heel cradle.

14. The method of claim 13 wherein the heel cradle is disposed between the outsole and the membrane in the heel portion.

15. The method of claim 14 wherein the heel cradle terminates short of the forefoot portion.

16. The method of claim 13 wherein the outsole includes an upwardly extending flange and the bead flange includes an end.

17. The method of claim 16 comprising positioning the end of the welt behind the flange so that the end is unviewable in finished footwear.

18. The method of claim 13 comprising securing a water impermeable liner to an interior of the upper.

* * * * *